Figure 1:
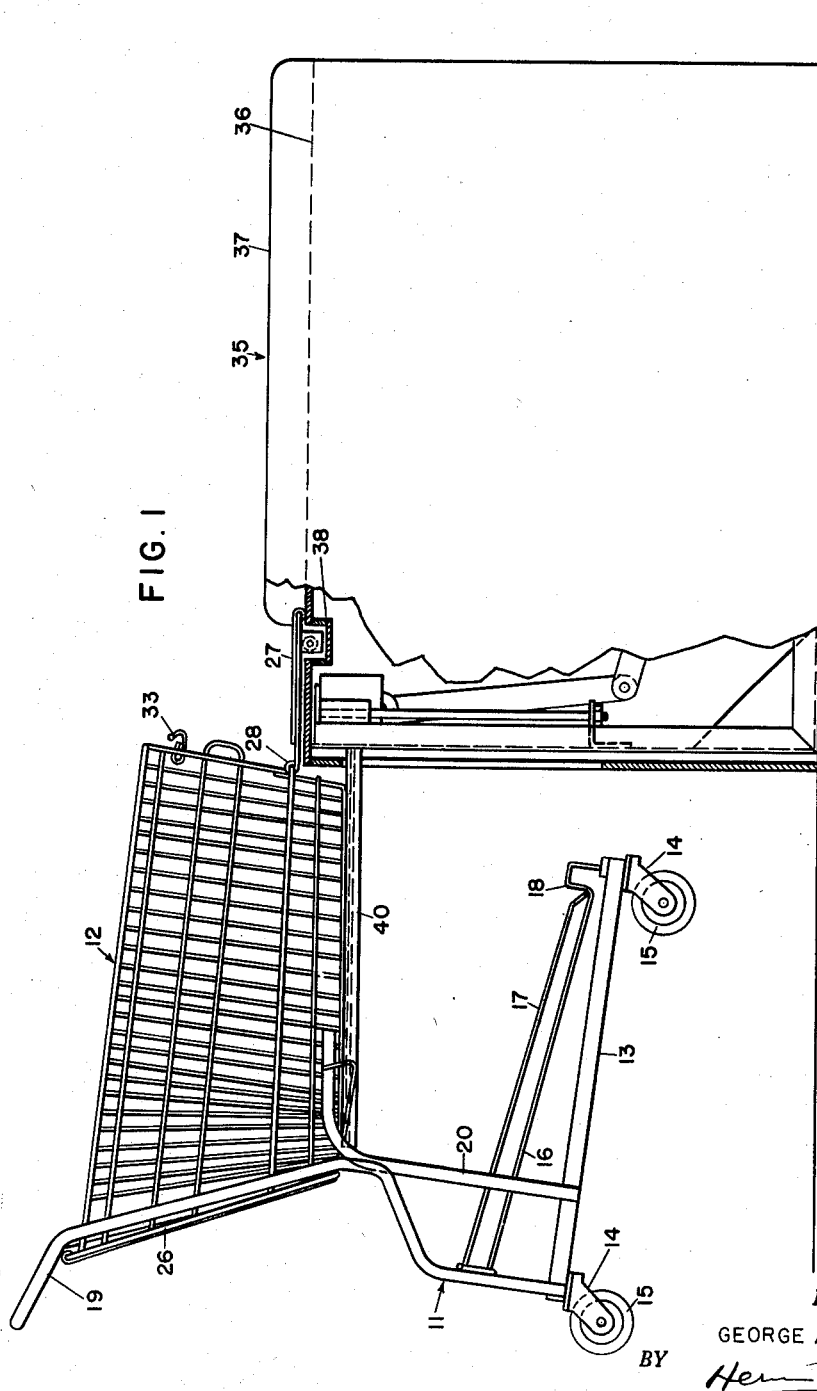

July 5, 1960

G. A. RAMLOSE 2,943,707

SHOPPING APPARATUS

Filed May 8, 1956

3 Sheets-Sheet 1

INVENTOR:
GEORGE A. RAMLOSE
BY

July 5, 1960
G. A. RAMLOSE
2,943,707
SHOPPING APPARATUS
Filed May 8, 1956
3 Sheets-Sheet 2
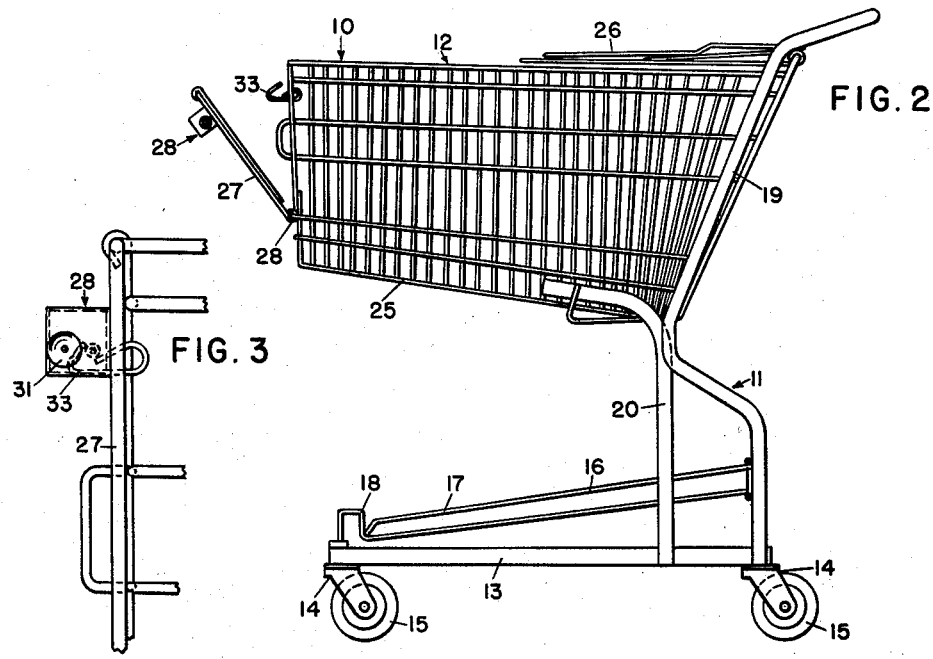
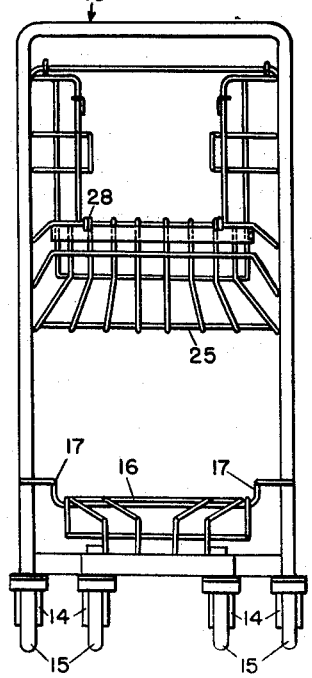
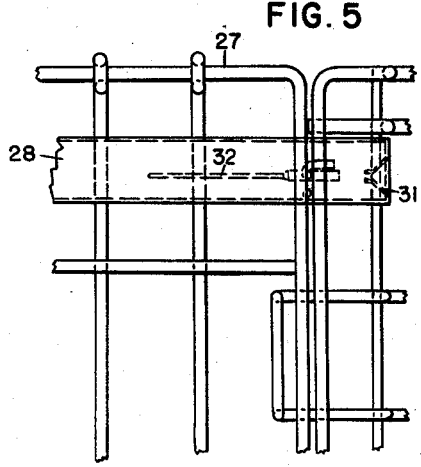
INVENTOR:
GEORGE A. RAMLOSE
BY July 5, 1960 G. A. RAMLOSE 2,943,707
SHOPPING APPARATUS Filed May 8, 1956 3 Sheets-Sheet 3

INVENTOR:
GEORGE A. RAMLOSE
BY

United States Patent Office 2,943,707
Patented July 5, 1960

2,943,707
SHOPPING APPARATUS
George A. Ramlose, Hingham, Mass., assignor to H. I. Sides, doing business as Sides Manufacturing Company, Jackson, Mich.

Filed May 8, 1956, Ser. No. 583,414

4 Claims. (Cl. 186—1)

This invention relates to an improved shopping apparatus, more particularly to a shopping cart and counter construction designed to facilitate the selection and checking out of merchandise in self service establishments.

Contemporary merchandising techniques have evolved a self service mode of distributing merchandise from the retailer to the consumer. The so-called "supermarkets" which have been developed, at present distribute almost any imaginable variety of consumer goods ranging from food through clothing, books, and hardware. The conventional manner of operation of these supermarkets, employs a variety of merchandise display racks in an enclosed area to which a potential customer is admitted. A shopping cart comprising a wire vehicle having a removable merchandise containing receptacle is provided the prospective shopper, who makes selections of desired merchandise among the displays, carrying the selected items in the receptacles of the shopping cart provided. Upon completion of selection, the customer proceeds to a check-out counter where the contents of the receptacle on the shopping cart are emptied, for tallying by the cashier.

Problems are engendered in the aforedescribed conventional check-out procedure, arising as a result of the bottlenecks developing at the cashier's counter, due to the fact that the receptacles are generally emptied by the customer or an employee, picking up each article from the receptacle and placing same on the counter for subsequent tallying by the cashier. Aside from the time consuming nature of this operation, the customer, or employee, is generally subjected to the discomfort of having to bend slightly in reaching between the receptacle and the counter.

It is with the above problems in mind that the present construction has been evolved, a construction providing means for facilitating the emptying of the contents of the shopping receptacle onto the cashier's check-out counter, thus speeding up the operation and eliminating discomfort of customer and checker.

It is accordingly a primary object of this invention to provide an improved shopping apparatus.

A further object of this invention is to provide means for facilitating the check-out of self-service selected merchandise.

An additional object of this invention is to provide an improved shopping cart which will implement the removal of articles carried thereby.

Another object of this invention is to minimize the distance through which selected merchandise must be moved between the shopping cart and check-out counter.

A further object of this invention is to provide an improved counter construction for implementing the check-out of articles brought thereto in a shopping cart.

It is also an object of this invention to provide improved check-out facilities for speeding up the handling of customers in "super market operations."

These and other objects of the invention which will become apparent from the following disclosure and claims are achieved by provision of merchandise collecting and carrying means in the form of a shopping cart having a receptacle provided with discharge means in the form of a collapsible wall. Article receiving means comprising a check-out counter is provided for use in conjunction with said shopping cart. Engaging and elevating means on the counter engages said cart and raises the receptacle on said shopping cart to the counter, and at the same time permits an operator to collapse the aforementioned collapsible wall, causing the articles contained in said receptacle to be discharged on the check-out counter, without necessitating any action on the part of the customer other than maneuvering of the shopping cart into position adjacent to the counter.

Figure 7:
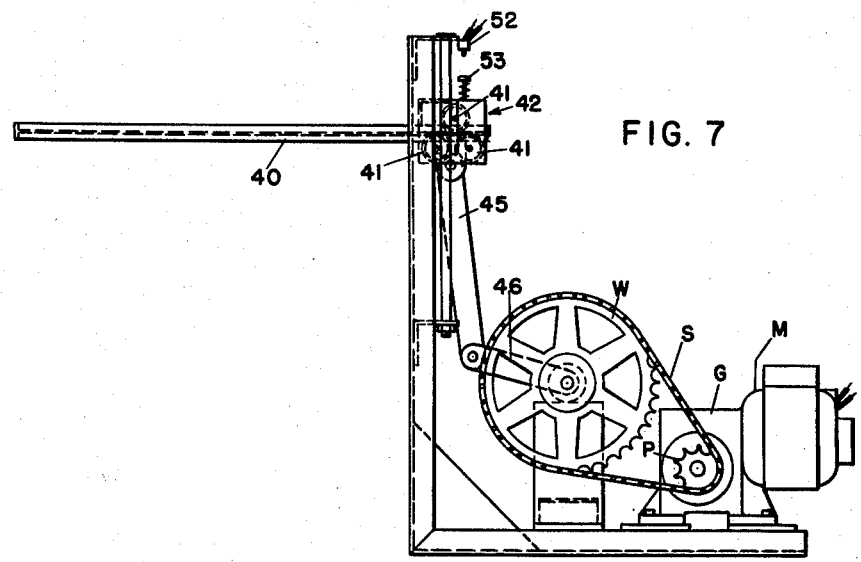
Figure 8:
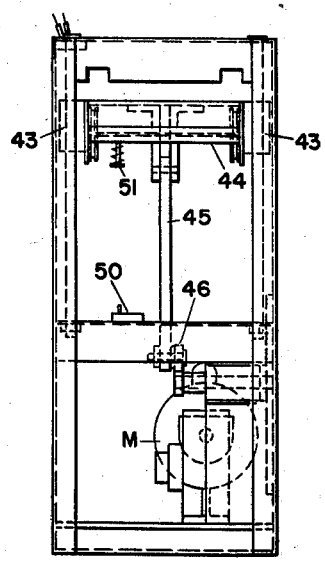

The specific constructional features of a preferred embodiment of this invention, and their mode of utilization, will be made most manifest and particularly pointed out in conjunction with the accompanying drawings, wherein:

Figure 1 represents a side elevational view illustrating the shopping cart supported in merchandise discharging position, in conjunction with the check-out counter, having parts broken away to illustrate some operational details of the apparatus; and Figure 2 is a side elevational view of the novel shopping cart illustrating the discharge wall in a partially open position; and Figure 3 is a detail looking from the side of the cart, illustrated in Figure 2, illustrating the latch mechanism employed in collapsing a wall of said cart for the discharge of merchandise therefrom; and Figure 4 is a front elevational view of the cart illustrated in Figure 2, with its wall in discharge position; and Figure 5 is a front elevational view of the structure illustrated in Figure 3; and Figure 6 is an illustration of a suggested key for use in operating the latch mechanism shown in Figures 3 and 5; and Figure 7 is a side elevational view of the fork lift mechanism embodied in the counter shown in Figure 1; and Figure 8 is a front elevational view of the structure illustrated in Figure 7.

Referring now more particularly to the drawings, like numerals in the various figures will be taken to designate like parts.

As best seen in Figure 2, this invention contemplates provision of a novel merchandise collecting and carrying shopping cart 10, having a chassis 11, and merchandise receiving receptacle 12, supported on said chassis.

The chassis 11, is provided with a lower horizontal frame work 13, which is of any desired configuration, and which in the instant arrangement is preferably made in the form of a trapezoid with its broader portion towards the rear of the chassis to provide the desired stability. Casters 14, rotatably supporting wheels 15, are provided at the corners of the framework 13, to support the cart 10, for locomotion. A forwardly sloped auxiliary rack 16, formed with side members 17, and front stop 18, to secure articles in position on the rack is supported above the framework 13. A handle strut 19, formed as seen in Figure 2, is most expeditiously employed to permit handling of the cart, since as will be observed it serves to support receptacle 12, in a position with its center of gravity located so as to provide maximum stability to the cart 10. This location of the center of gravity to achieve maximum stability is obviously on a line passing through the geometric center of the framework 13, between wheels 15. A supporting strut 20, formed as seen in Figure 2, is provided on each side of frame 13, to provide additional support for receptacle 12.

The receptacle 12, is preferably formed of a wire material in a configuration as seen in Figure 2. The bottom wall 25, in normal position on chassis 11 slopes rearwardly, so that any material supported thereon will tend to slip to a point whereby the center of gravity will be located, as above discussed, to attain maximum stability. The rear wall 26, of receptacle 12, is hingedly mounted so that it may pivot forwardly and upwardly to the position seen in Figure 2. This arrangement is provided so that a plurality of shopping carts may be arranged with their receptacles nesting, one within the other. It will be observed that this rear wall 26, will be normally biased by its own weight to a downward position closing off receptacle 12. The front or discharge wall 27, is hinged at 28, to drop down, permitting discharge of the contents of said receptacle, in a manner to be hereinafter more fully explained. A latch mechanism 28 and detent 33, are provided for securing front wall 27, in its receptacle closing position.

A preferred form of latching arrangement is shown schematically in Figures 3, 5 and 6 where a key 30 upon insertion in funnel aperture 31, will engage spring pressed slide bar 32, to force same away from hooked detent 33, thus permitting the discharge wall 27, to pivot downwardly about its hinge 28.

An article receiving counter 35, is provided for use in conjunction with shopping cart 10, to aid in checking out of merchandise selected and carried by said cart.

Counter 35, has a conventional horizontal counter surface 36, here shown as provided with side guards 37. A recess 38, as illustrated in Figure 1, is formed at one end of the counter for the purpose to be made hereinafter more apparent. At the recessed end, the counter is provided with an engaging elevator structure of the forklift type as illustrated in Figures 7 and 8. Tines 40, are retractably mounted between rolls 41 and slide 42. The slide 42, comprises two end plates 43, connected together by a cross member 44, which is pivotally coupled to connecting rod 45. Connecting rod 45, is in turn pivotally connected to crank 46, which is driven in a conventional manner from motor M through gear reducer G, pinion P, sprocket chain S, and crank wheel W. A limit switch 50 of a conventional type controlling the operation of motor M is provided at a point on the counter approximately midway from the bottom thereof, which is engaged by stop 51, supported on cross bar 44. An upper limit switch 52, similarly connected in the motor circuit and actuated by said stop 53, serves to shut off the motor when the forklift tines 40, are in the upper position as seen in Figure 1.

*Operation*

The aforedisclosed structures may be most expeditiously employed in conjunction with super market operations, for checking out merchandise in a rapid, efficient manner. Thus, the shopping cart 10, as illustrated in Figure 2, is selected by a customer from a nesting group of carts where unused carts are stored with the forward end of one nesting within the receptacle 12, of the other by forcing rear wall 26, to a position shown in Figure 2. Removal of the cart selected from the nested group serves to permit rear wall 26, to drop to an operative position as seen in Figure 1, with the receptacle in an article receiving condition.

The shopping cart is then pushed by the customer past display racks carrying the various available merchandise, the selections are made from these racks and the selected merchandise deposited in receptacle 12 of the cart 10. As previously noted, the inclined bottom 25 of the receptacle tends to slide any article deposited thereon towards a point of maximum stability so as to eliminate the possibility of the shopping cart becoming unbalanced. Auxiliary rack 16 may be employed for carrying bulky merchandise, or for storing articles which the shopper may be carrying, such as clothing, pocketbooks, or the like.

When the shopper has selected all the desired merchandise, the cart 10 is wheeled to the counter 35 where a checker may tally the merchandise, which is then packed. At the counter the forward edge of the shopping cart 10 is brought over tines 40, of the elevator structure. These tines will normally be in a lowered position to receive and engage a cart. Once the forward edge of the cart abuts against the counter the checker or cashier actuates a switch either manually or pedally, or an automatic switch actuated by contact of the front of the receptacle 12 with the counter may be provided to energize motor M, causing crank 46 to force connecting rod 45 and slide 42 to an upward position as seen in Figure 1, thus elevating the fork tines and the cart supported thereon. In this elevated position, key 30 is inserted in latch mechanism 28, to release detent 33, thus permitting the front or discharge wall 27, to drop to a position as seen in Figure 1, wherein the contents of receptacle 12, may readily be pushed onto the counter for checking out.

When the cart 10 is emptied the operator presses a switch which actuates motor M to lower the fork tines 40. At the bottom of its travel limit switch 50 is actuated shutting off the motor M.

It is thus seen that a novel shopping apparatus has been provided for facilitating self service merchandising techniques. A novel shopping cart functions in combination with a novel counter to expedite checking out procedures and to minimize the physical efforts of both customer and cashier.

The above disclosure has been given by way of illustration and elucidation and not by way of limitation, and it is desired to protect all embodiments of the hereindisclosed inventive concept, within the scope of the appended claims.

What is claimed is:

1. Apparatus for facilitating self service market shopping, said apparatus comprising: an article receiving counter; an elevating structure extending out at one end of said counter; a wheeled chassis; a merchandise receiving receptacle on said chassis adapted for engagement by said elevating structure; a discharge wall hingedly mounted at the front of said receptacle; and a latch mechanism on said wall whereby after said receptacle is filled with selected merchandise, the merchandise may be discharged onto said counter for checkout.

2. Apparatus as in claim 1 in which said latch mechanism is arranged on the outside of said discharge wall; and said counter is provided with a recess at one end to receive said latch mechanism when said receptacle is elevated and said discharge wall is in discharge position, whereby said wall will lie flat on said counter to facilitate discharge of merchandise from said receptacle.

3. Apparatus for facilitating self service market shopping, said apparatus comprising: an article receiving counter; an elevating structure carried by and extending out of said counter; a wheeled chassis; a merchandise receptacle on said chassis adapted for engagement by said elevating structure; a discharge wall hingedly mounted on said receptacle; and a latch mechanism on said wall to maintain said wall in upright position to permit storage of merchandise in said receptacle and adapted, when unlatched, to release said wall to facilitate removal of merchandise from the receptacle.

4. Apparatus as in claim 3 in which said latch mechanism is arranged on the outside of said discharge wall; and said counter is provided with a recess to receive said latch mechanism when said receptacle is elevated and said discharge wall is in discharge position whereby said wall will lie flat on said counter.

References Cited in the file of this patent

UNITED STATES PATENTS

| | | |
|---|---|---|
| 2,286,548 | Jackson et al. | June 16, 1942 |
| 2,412,158 | Kuehlman et al. | Dec. 3, 1946 |
| 2,536,068 | Lehmann | Jan. 2, 1951 |
| 2,596,686 | Hess | May 13, 1952 |
| 2,596,775 | Kasper | May 13, 1952 |
| 2,604,190 | Meyer | July 22, 1952 |
| 2,643,010 | Hott et al. | June 23, 1953 |
| 2,644,695 | Enders | July 7, 1953 |
| 2,672,218 | Genung | Mar. 16, 1954 |
| 2,757,810 | Aukens | Aug. 7, 1956 |
| 2,808,127 | Westberry | Oct. 1, 1957 |